United States Patent [11] 3,622,342

[72] Inventor Irving I. Rusoff
  Park Ridge, N.J.
[21] Appl. No. 857,236
[22] Filed Sept. 11, 1969
[45] Patented Nov. 23, 1971
[73] Assignee Nabisco, Inc.

[54] PROCESS FOR PREPARATION OF MILK CRUMB COMPOSITIONS
  8 Claims, No Drawings

[52] U.S. Cl. ........................................................ 99/23
[51] Int. Cl. ....................................................... A23g 1/00
[50] Field of Search ........................................... 99/23–26, 54–56, 134, 138

[56] References Cited
  UNITED STATES PATENTS

| | | | |
|---|---|---|---|
| 3,184,315 | 5/1965 | Wolf............................ | 99/23 |
| 2,091,149 | 8/1937 | Iverson........................ | 99/134 |

*Primary Examiner*—Raymond N. Jones
*Assistant Examiner*—Roger B. Andewelt
*Attorney*—I. Allen Strombeck ABSTRACT: A process for the preparation of milk crumb compositions comprising dry blending of a sweetening agent, milk solids and chocolate liquor and extrusion of the mixture followed by cooling and comminution of the extrudate.

PROCESS FOR PREPARATION OF MILK CRUMB COMPOSITIONS

BACKGROUND OF THE INVENTION

This invention relates to a process for the preparation of milk crumb compositions. More particularly, the present invention provides a process whereby milk crumb compositions are prepared by a dry blending of sweetening agents, milk solids and chocolate liquor followed by extrusion of the mixture and cooling and comminuting of the extrudate.

Milk crumb is an intermediary product useful in the production of milk chocolate products to prevent rancidity and to provide the characteristic milk flavor to these products. The general concept of a milk crumb composition consisting of a sweetening agent and milk solids is documented in the prior art U.S. Pat. No. 2,091,149 to Iverson, discloses such a composition and a method for its preparation. Rosecky in U.S. Pat. No. 2,358,418 discloses a machine and process for making sugared milk powder. The addition of chocolate liquor to protect milk fat from going rancid is disclosed in the art, e.g. see *The Technology of chocolate*, Kempf, The Manufacturing Confectioner Publishing Co., (1964), page 61. Applicant, however, is unaware of any prior art process for the preparation of a milk crumb composition utilizing a dry blending of the ingredients followed by extrusion of the mixture and subsequent cooling and comminuting of the extrudate.

It is, therefore, an object of the present invention to provide a novel process for the preparation of milk crumb compositions.

It is a further object of the present invention to provide a milk crumb composition which prevents rancidity and provides the characteristic milk flavor to milk chocolate products.

It is a still further object of the present invention to provide a process for the preparation of milk crumb compositions utilizing an extrusion operation.

Other objects, improvements and advantages of the present invention will be readily apparent to one skilled in the art from the following detailed description.

SUMMARY OF THE INVENTION

These objects are achieved by the present invention which is directed to a process for the preparation of milk crumb compositions utilizing a dry blending of the ingredients and extrusion of the mixture followed by cooling and comminution of the extrudate to form the desired compositions. The process comprises an initial dry blending of sweetening agents, milk solids and chocolate liquor to form a dry mixture. This mixture is then passed through an extruder with the addition of a small prescribed amount of water and the extrudate is then cooled and comminuted to form the desired milk crumb compositions.

The sweetening agent of the milk crumb compositions of the present invention is preferably sucrose. It should be understood, however, that dextrose, corn syrup solids, lactose, invert sugar, honey solids and mixtures thereof, may also be used. The only requirement for the sweetening agent is that it be in the form of a dry power. It is also possible to use a low calorie sweetening agent, e.g., calcium cyclamate, in partial replacement of the sweetening agent. The sweetening agent of the present invention is present from about 50 percent to about 70 percent, preferably from about 55 percent to about 65 percent by weight of the total composition. If more than about 70 percent of the sweetening agent by weight of the total composition is utilized, then a carmelization reaction is likely to occur possibly resulting in a product with undesirable flavor, taste and color. If less than about 50 percent of the sweetening agent by weight of the total composition is utilized then there is a possibility that a stable product will not be formed.

The milk solids useful in the present invention are selected from whole milk solids and nonfat milk solids. These milk solids are the dried product obtained preferably from the spray drying of whole or skim milk by any of the well-known methods. Whole or nonfat milk solids produced by other methods of drying, e.g. drum drying, and available in powdered form are also suitable for use. If nonfat milk solids are utilized it may be necessary to add an amount of suitable fatty material e.g. butter oil, or whole cream, to raise the fat content to the required level as required by the Official Standards of Identity as promulgated in the Code of Federal Regulations for milk chocolate. These Standards require not less than 3.66 percent by weight of milk fat in the total composition of milk chocolate products. The whole or nonfat milk solids also provide an excellent source of protein. The milk solids of the present invention are present from about 25 percent to about 45 percent, preferably from about 32 percent to about 37 percent, by weight of the total composition. If more than about 45 percent of the milk solids by weight of the total composition are utilized then the possibility exists that the fat alone will extrude out without binding up in the composition resulting in an oily appearance to the extrudate. If less than about 25 percent of the milk solids by weight of the total composition are utilized then the possibility exists that not enough fat will be present to act as a lubricant and the extrudate formed may not be desirable.

The chocolate liquor useful in the present invention is obtained by well-known process whereby cocoa beans are roasted, cooled to room temperature and then milled to form the desired liquor. The finished chocolate liquor contains between 50 percent and 58 percent cocoa butter by weight of the chocolate liquor. The chocolate liquor is present from about 2.5 percent to about 7.5 percent, preferably from about 4 percent to about 6 percent by weight of the total composition. If more than about 7.5 percent of the chocolate liquor by weight of the total composition is utilized then the extrudate may not bind well and may tend to smear making it difficult to comminute the extrudate. If less than about 2.5 percent of the chocolate liquor by weight of the total composition is utilized then there exists the possibility that the fat present in the composition will not be stable and flavor problems may therefore result.

The order of blending of the dry ingredients is not critical although it has been found that the following procedure of blending results in a uniform, lump-free, well-dispersed mixture. The sweetening agent is added to a commercially suitable mixer and agitation is begun. The premelted chocolate liquor is then slowly added while the agitation is continued. After all the chocolate liquor has been added, the milk solids are added and the agitation is continued for an additional 4-5 minutes. The total mixing time is about 25 minutes.

The mixture is then placed in a Wenger extruder for the extrusion operation. In the extruder the mixture is heated under pressure in the presence of about 1 percent to about 3 percent, preferably about 2 percent, water by weight of the total composition. The water, heat and pressure cause a reaction within the mixture wherein it is believed that the sweetening agent is partially solubilized allowing it to encapsulate the mixture upon expansion. The extrudate is of a glossy appearance and the water that was added in the extruder evaporates off as steam. The moisture content of the mixture upon entering the extruder is about 5 percent and the moisture content of the extrudate coming out of the extruder is about 3-3.5 percent, resulting in a small loss in the moisture content. The extruder temperature, measured at the die, should be from about 220° F. to about 270° F., preferably from about 245° F. to about 255° F., to assure adequate product formation. The mixture is in the extruder for a period of time from about 1 second to about 3 seconds, preferably about 2 seconds.

After the extrusion operation has been completed the extrudate is subjected to a cooling process. This cooling can be accomplished by any convenient and economical method. One method which can be used entails collecting the extrudate on solid aluminum pans and subjecting these pans to crossflow cooling until they reach ambient temperature. Other means of cooling include the use of cooling tunnels and refrigerated air units. It is also possible to just allow the extrudate to reach the desired ambient temperature merely by remaining in pans or bins at room temperature, although this obviously requires a greater time period.

After cooling the extrudate to ambient temperature, about 65° F. to about 75° F., the extrudate can be broken into small, preferably 1 to 2 inch, strands. This breaking operation can be accomplished by means of a finger breaker or any other suitable method. The breaking of the extrudate into small strands is not a required step in the process of this invention but merely a convenience allowing for easier feeding of the cooled extrudate into the grinder.

The small, preferably 1- to 2-inch strands, are then ground in a commercially available mill to form a light chocolate brown powder of particle size such that 60 percent passes through a 60-mesh screen. That which is retained on the 60-mesh screen in reground and then screened again to the desired size forming the milk crumb compositions of the present invention.

The milk crumb compositions produced by the process of the present invention can be utilized in the production of milk chocolate as described in *The Technology of Chocolate*, Kempf, The Manufacturing Confectioner Publishing Co., (1964), pages 62–64.

The following examples will illustrate in detail the manner in which the invention may be practiced. It will be understood, however, that the invention is not confined to the specific limitations set forth in the individual examples but rather to the scope of the appended claims.

EXAMPLE I 60.85 parts by weight of fine ground sucrose were added to a Readco Upright Dough Mixer (Model No. 1 ½ STA) manufactured by Read Corporation, York, Pa. and equipped with a two-horsepower motor and a two-speed single-arm dough-mixing blade. Agitation was begun and five parts of Heath Chocolate Liquor manufactured by Merckens Chocolate Company, Mansfield, Mass., melted and preheated to 135° F. were added slowly with continued agitation. After all of the chocolate liquor was added, 34.15 parts by weight of the whole milk solids were slowly added with continued agitation for an additional period of about 5 minutes. The total mixing time was about 25 minutes. THe mixture was fed to a Wenger X–25 Extruder manufactured by The Wenger Manufacturing Company, Sabetha, Kans. and equipped with cut-flight screw with mild steel jacket, steam lock and standard shaft. The 10-hole, 3/16-inch stainless steel die has the holes on a 3¼ -inch circle and provisions for measuring the die temperature by means of a thermocouple. Water was fed into the extruder and the temperature was kept between 245° F. and 255° F. The extrudate was collected on solid aluminum pans and subjected to crossflow cooling and cooled to ambient temperature, about 72° F. The extrudate was then fed through a finger breaker into the Fitz Mill Model D No. 1 Screen Grinder manufactured by Fitzpatrick Company, Elmhurst, Ill., wherein it was ground into a light chocolate brown powder of which about 60 percent passed through a 60-mesh screen and the remainder was reground and screened again. The milk crumb compositions thus formed were subsequently transferred to storage bins.

EXAMPLE II

A milk crumb composition is prepared according to the procedure of example I containing the following ingredients:

| | % by Weight |
|---|---|
| Fine Ground Sucrose | 60.85 |
| Chocolate Liquor | 5.00 |
| Butter Oil | 9.73 |
| Dry Skim Milk Solids | 24.42 |
| 6 | |
| Total | 100.00 |

The milk crumb composition so prepared is a light brown chocolate powder and when utilized to prepare milk chocolate helps to prevent rancidity and to provide the characteristic milk flavor.

When the fine ground sucrose of example II is replaced by fine ground dextrose substantially the same results are obtained, i.e., the same desirable milk crumb composition is formed.

When the fine ground sucrose or a part thereof of example II is replaced on an equal weight basis by a sweetening agent selected from the group consisting of corn syrup solids, lactose, invert sugar, honey solids and calcium cyclamate substantially equivalent results are obtained, i.e., the same desirable milk crumb composition is formed.

EXAMPLE III

A milk crumb composition is prepared according to the procedure of example I containing the following ingredients:

| | % by Weight |
|---|---|
| Fine Ground Sucrose | 59.30 |
| Whole Milk Solids (26% fat) | 33.40 |
| Heavy Cream | 2.25 |
| Chocolate Liquor | 5.05 |
| Total | 100.00 |

The milk crumb composition so prepared is a light brown chocolate powder and when utilized to prepare milk chocolate helps to prevent rancidity and to provide the characteristic milk flavor.

EXAMPLE IV

A milk chocolate composition is prepared in accordance with methods known and used in the art having the following composition:

| | % by Weight |
|---|---|
| Cocoa Butter | 24.00 |
| Sugar | 19.98 |
| Milk Crumb | 42.00 |
| Chocolate Liquor | 14.00 |
| Minors | 0.02 |
| Total | 100.00 |

This milk chocolate has excellent milk flavor and taste.

In addition to the preferred embodiments described herein, other arrangements and variations within the spirit and scope of the invention and the appended claims will occur to those skilled in the art.

What is claimed is:

1. A process for the production of milk crumb compositions containing from about 50 percent to about 70 percent of a sweetening agent, from about 25 percent to about 45 percent milk solids and from about 2.5 percent to about 7.5 percent chocolate liquor comprising the steps of:
   a. blending the dry ingredients to form a mixture;
   b. passing the mixture through an extruder with the addition of from about 1 percent to about 3 percent water by weight of the total mixture and a temperature range of from about 220° F. to about 260° F. for a period of time of from about 1 to about 3 seconds;
   c. cooling the extrudate to a temperature of from about 65° F. to about 75° F.; and
   d. comminuting the cooled extrudate such that about 60 percent passes through a 60 mesh screen.

2. The process of claim 1 wherein the sweetening agent is selected from the group consisting of sucrose, dextrose, corn syrup solids, lactose, invert sugar, honey solids, low calorie sweetening agent and mixtures thereof.

3. The process of claim 2 wherein the sweetening agent is sucrose.

4. The process of claim 1 wherein milk solids are selected from the group consisting of whole milk solids and nonfat milk solids.

5. The process of claim 4 wherein the milk solids are whole milk solids.

6. The process of claim 1 wherein the temperature range within the extruder is from about 245° F. to about 255° F.

7. The process of claim 1 wherein about 2 percent water by weight of the total mixture is added to the extruder.

8. The process of claim 1 wherein the mixture is within the extruder for a period of time about 2 seconds.

* * * * *